June 6, 1933.   R. C. HAIMBAUGH   1,913,116
VALVE
Filed Jan. 26, 1931

INVENTOR
RAYMOND C. HAIMBAUGH.
BY
ATTORNEY

Patented June 6, 1933

1,913,116

UNITED STATES PATENT OFFICE

RAYMOND C. HAIMBAUGH, OF CHICAGO, ILLINOIS, ASSIGNOR, BY MESNE ASSIGNMENTS, TO GRIGSBY-GRUNOW COMPANY, A CORPORATION OF ILLINOIS

VALVE

Application filed January 26, 1931. Serial No. 511,321.

This invention relates to valves and particularly to check valves for use in domestic refrigerating systems. In such systems where sulphur dioxide and similar refrigerants are employed considerable difficulty has been experienced in devising a valve which will not leak or chatter.

An object of this invention is to devise such a valve which will be simple and cheap to manufacture.

Figure 1:
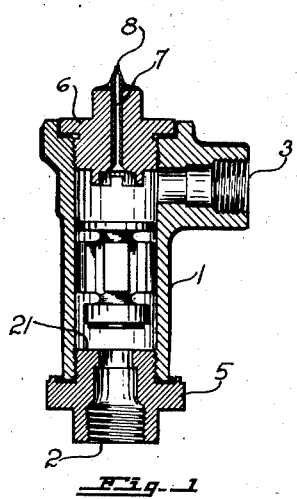
Figure 1 is a sectional view of a valve embodying this invention.

The valve comprises a valve casing 1 of any suitable metal, such as brass, provided with an inlet opening 2 and a discharge opening 3. The inlet opening 2 is suitably threaded so that the valve may be connected to a coupling device 5. The discharge outlet 3 may also be threaded for connection to an outlet conduit. As shown here the top of valve casing 1 is closed by a threaded plug 6 having a central bore 7 terminating in a pinched portion 8. While this plug may be unnecessary for some purposes, its presence is desirable if the valve is to be used in connection with a domestic refrigerating system. In such case, a charge of refrigerant, or any other material, may be introduced through bore 7 and the system sealed at 8.

Figure 3:
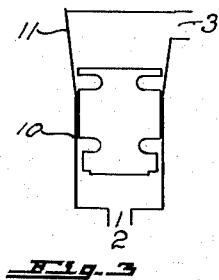
Figure 3 is a diagrammatic view showing the relation of the valve member and the valve casing.
Figure 4:
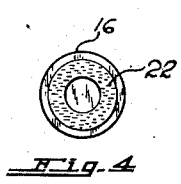
Figure 4 is a detailed view of the face of the valve member.
Figure 2:
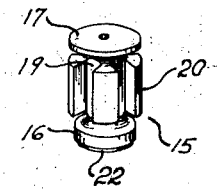
Figure 2 is a detail of the valve member.

As shown in Figure 3, in exaggerated form, the interior surface of valve casing 1 comprises a cylindrical portion 10 and an outwardly tapering portion 11. Suitably disposed within casing 1 is a valve member generally designated as 15. This member comprises two circular bodies 16 and 17 connected by an intermediate reduced portion 19. The length of valve member 15 is preferably equal to or smaller than that of cylindrical portion 10. Radially projecting from the intermediate portion 19 are a plurality of wings 20. As shown in Figures 1 and 3, body portion 17 and intermediate portion 19, together with the wings, have a diameter substantially equal to the diameter of cylindrical portion 10 of casing 1 and fit snugly therein. Lower body portion 16, however, is reduced in diameter.

When valve member 15 rests on the inside surface 21 of connecting member 5, communication through valve casing 1 is cut off. This will happen when the back pressure from 3 is sufficiently greater than the inlet pressure to force valve member 15 down. In its open position, valve member 15 is adapted to be raised from seat 21 on the inner surface of member 5 and take a position anywhere between the extreme upper position and the lowest position offering a through path within valve casing 1. Gas or liquid entering inlet passage 2 will be diverted around the edge of lower body portion 16 of the valve member and upwardly along the spaces between wings 20. The path is completed between the periphery of upper body portion 17 and the tapering side walls 11 of the casing.

Wings 20 have their outer surfaces snugly fitting the cylindrical surface 10 of the casing. In addition, the valve member which is preferably made of metal, such as brass, has enough mass so that the valve will open and close at sufficiently different pressures to insure stability.

In order to insure long life, there is preferably disposed a ring 22 of hard material, such as hardened steel, in the bottom face of lower body portion 16. This may be done by welding. This ring may be ground to a smooth surface. The inner portion 21 of inlet connection 5, upon which valve member 15 seats may be ground smooth also. A valve of this construction, although of general application, has been found to operate quietly and efficiently in a refrigerating system. By virtue of its construction, leakage of refrigerant is negligible.

I claim:

1. A valve comprising a casing having an inlet opening provided with a seat and an outlet opening, a channel within said casing and between said openings, said channel comprising a cylindrical portion adjacent said inlet opening and an outwardly tapering portion adjacent said outlet, and a valve member adapted to operate in said channel, said valve member comprising an elongated body, a seating portion at one end of said body adapted to co-operate with the seat on said inlet portion, a substantial portion of said body portion being adapted to fit snugly within the cylindrical channel and so shaped as to provide a gas passage along a part of said body portion only of said valve member.

2. A valve comprising a casing having inlet and outlet openings, said inlet opening having a seat, a channel within said casing between said openings comprising a cylindrical portion and an outwardly tapering portion, said cylindrical portion being disposed adjacent said inlet portion of the valve, and a valve member disposed within said channel, said valve member comprising an elongated body having a circular portion adjacent the inlet adapted to co-operate with said valve seat, said circular portion being reduced in size to provide a clearance between the periphery thereof and the wall of the cylindrical channel, said elongated body having channels formed lengthwise thereof, said channels being peripherially disposed and extending only a portion of the length of said body, the total length of said valve member being less than the length of said cylindrical channel.

3. A valve comprising a casing having an inlet and outlet, said inlet being formed with a valve seat, a channel between said inlet and outlet comprising a cylindrical and an outwardly tapering portion, the latter being disposed at the outlet portion of the casing, and a valve member disposed within said channel, said valve member comprising an elongated body whose length is not greater than the length of the cylindrical channel, said valve member having a cylindrical portion adapted to fit snugly within said cylindrical channel, an intermediate portion having a reduced body and outwardly flaring wings, said wings being adapted to fit snugly within said cylindrical channel and an end portion of reduced diameter adapted to co-operate with the seat on the inlet portion of said valve casing.

4. A valve comprising a casing having an inlet opening provided with a seat and an outlet opening, a channel within said casing and between said openings, said channel comprising a cylindrical portion adjacent said inlet opening and an outwardly tapering portion adjacent said outlet opening, said cylindrical portion having the same diameter as the small end of said tapering portion, and a valve member adapted to operate in said channel, said valve member comprising an elongated body having a generally cylindrical shape and adapted to fit snugly within the cylindrical channel, said member having a seating portion at one end thereof adapted to co-operate with said inlet opening and being provided with a plurality of longitudinal flutes peripherally disposed around said member, said flutes extending a substantial portion of the length of said valve member but being short of each end thereof.

In testimony whereof he affixes his signature.

RAYMOND C. HAIMBAUGH.